United States Patent

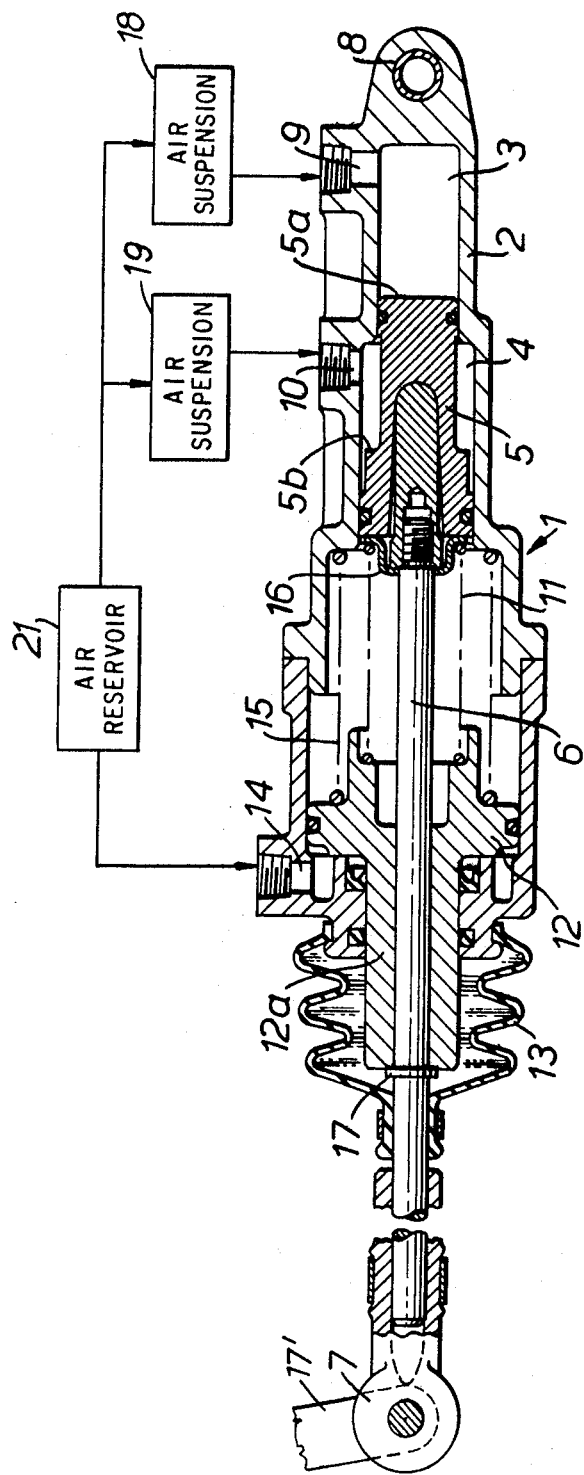
INVENTORS
WILBUR MILLS PAGE & ALAN WEEDEN GREEN
ATTORNEYS
Norris & Bateman

[11] 3,627,387

| [72] | Inventors | Wilbur Mills Page;<br>Alan Weeden Green, both of Lincoln, England |
|---|---|---|
| [21] | Appl. No. | 857,325 |
| [22] | Filed | Sept. 12, 1969 |
| [45] | Patented | Dec. 14, 1971 |
| [73] | Assignee | Clayton Dewandre Company Limited<br>Lincoln, England |
| [32] | Priority | Oct. 11, 1968 |
| [33] | | Great Britain |
| [31] | | 48,316/68 |

[54] AIR PRESSURE-OPERATED BRAKING SYSTEMS
2 Claims, 1 Drawing Fig.

[52] U.S. Cl. .................................................. 303/22 A, 188/195
[51] Int. Cl. .................................................. B60t 8/18
[50] Field of Search .......................................... 303/22, 22 A, 6, 6 C; 280/124 F; 188/195

[56] References Cited
UNITED STATES PATENTS

| 3,043,633 | 7/1962 | Hubscher .................... | 303/22 |
| 3,456,990 | 7/1969 | Page et al. .................... | 303/22 |

*Primary Examiner*—Milton Buchler
*Assistant Examiner*—John J. McLaughlin
*Attorney*—Norris & Bateman ABSTRACT: In a vehicle-braking system which includes an apportioning valve actuated in accordance with vehicle load as determined by pressures in the vehicle's air suspension system, said valve is controlled by a device comprising a control piston responsive to pressure in said suspension system and a further piston responsive to reservoir pressure and which overrides the control piston to set the apportioning valve to the "fully-laden" position if reservoir pressure falls below a predetermined value.

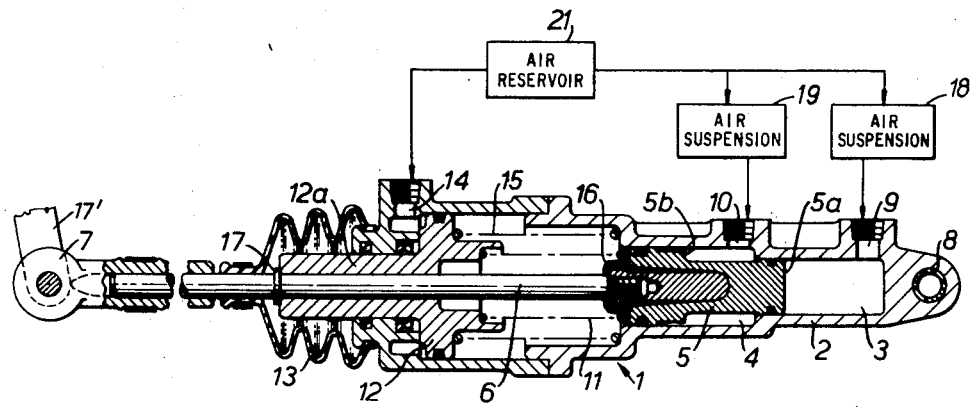

AIR PRESSURE-OPERATED BRAKING SYSTEMS

This invention relates to air pressure-operated braking systems for motor vehicles fitted with air suspension and is concerned particularly with systems embodying an apportioning valve for limiting the permitted degree of braking in accordance with vehicle load. The present invention provides in a system of this character an improved and simplified device for actuating the apportioning valve automatically in accordance with the pressure prevailing in the air bags or equivalent suspension units whilst ensuring that the system fails safe, that is, that the apportioning valve is set to the "fully laden" condition in the event of an abnormal system leak due to failure of a suspension unit or other cause.

According to the invention a device for the purpose mentioned comprises in a unitary structure a spring-loaded control piston responsive to pressure in the air bags or like suspension units and having operative connection with the control member of the apportioning valve, and a further spring-loaded piston responsive to reservoir pressure and adapted upon fall of reservoir pressure below a predetermined value to override the control piston and set the apportioning valve control member to the "fully laden" position.

One particular embodiment of the invention devised for actuating the light/laden or apportioning valve disclosed in assignee's U.S. Letters Pat. No. 3,512,845 issued May 19, 1970 will now be described, with reference to the accompanying drawing, which is an axial section through the control device. The invention comprises a control device that is an improvement over that disclosed in U.S. Letters Pat. No. 3,456,990.

As shown, the device comprises an elongated housing, one end of which constitutes a control cylinder 2 having two chamber sections 3, 4 of different diameter and which receive a stepped control piston 5. This piston has a thrust-transmitting connection with one end of a piston rod 6 which is disposed axially of the housing and extends beyond the housing at the other end where it is fitted with a knuckle member 7 by which it is pivotally connected to the actuating lever 17 of the apportioning valve as disclosed in said U.S. Pat. No. 3,456,990. The housing also has a socket 8 or equivalent means at the control cylinder end for reception of a bolt or like means securing the device to the vehicle frame in alignment with the apportioning valve. The end face 5a and the annular surface 5b of the stepped control piston are of equal area and the housing is provided with port connections 9, 10 to the two chamber sections, these connections in use being connected respectively to the near and offside suspension units 18, 19, or to the levelling valves controlling these units. Reference in the claims to connection of the control cylinder to the suspension units includes operative connections to the suspension units or the levelling or other control valves thereof. In this manner, the said two piston surfaces provide a mean output against a graduated spring 11 loading the piston, resulting in a more accurate proportioning of the braking pressure against vehicle load than would be attained using only one point in the suspension system as the controlling factor.

Beyond the control cylinder portion the housing is enlarged to receive a second piston 12 which is also of stepped form, its smaller or hub portion 12a having a sliding fit on the piston rod 6 and extending with a sealed sliding fit on the piston rod 6 and extending with a sealed sliding fit through an opening in the end wall of the housing in the direction towards the apportioning valve, this end of the second piston being enclosed by a gaiter 13. A port 14 in or adjacent said end wall is connected to the reservoir 21 and the reservoir pressure, acting on the outer face of said piston 12, urges the piston inwards against the action of a coiled spring 15 interposed between the inner face of the piston 12 and an annular shoulder on the housing. Operative connection of the reservoir to the suspension units is also indicated in the drawing. The loading spring 11 for the control piston 5 bears at one end against said piston, preferably through a thrust plate 16, and at the other end against the larger piston 12 and the device operates as follows:

Under normal conditions reservoir pressure acting on the larger piston 12 holds it in an inwardly displaced position against the action of its loading spring 15 and the control piston 5 senses pressures in the suspension system and through the piston rod 6 set the actuating bar of the apportioning valve. Should reservoir fall below a predetermined value, e.g., 50 p.s.i., the piston 12 will be moved outwards by its loading spring 15 and, towards the end of this movement, the hub portion 12a of said piston engages a collar 17 on the piston and thereafter takes the piston rod with it to the position shown in the drawing whereby the apportioning valve is set to "fully laden" position. During this operation the spring 15 loading the piston 12 overrides the spring 11 loading the control piston 5 but as soon as the working reservoir pressure is restored the larger piston is displaced and the control piston takes over again the sole control of the apportioning valve.

We claim:

1. A load responsive control device for incorporation in a vehicle air-braking system wherein an air pressure reservoir is operatively connected to an air pressure suspension and an apportioning valve adapted to be controlled by said device is provided in the system for controlling braking in accord with vehicle load, said device comprising a spring-loaded control piston positioned in response to pressure derived from a plurality of suspension units and means for operatively connecting said control piston to a control member of said apportioning valve, and a second spring-loaded piston coaxial with said first piston positioned in response to reservoir pressure, and means interconnecting said pistons, said control piston having direct thrust-transmitting connection with a piston rod connected to said control member of the apportioning valve, the second piston being normally disconnected from said piston rod but, upon reduction of reservoir pressure below said predetermined value, being moved by its loading spring into engagement with an abutment on said rod thereby to move the rod to set the apportioning valve to said fully laden position.

2. A load responsive control device for incorporation in a vehicle air-braking system wherein an air pressure reservoir is operatively connected to an air pressure suspension system and an apportioning valve adapted to be controlled by said device is provided for controlling braking in accord with vehicle load, said device comprising a spring-loaded control piston positioned in response to pressure derived from a plurality of suspension units and means for operatively connecting said control piston to said apportioning valve, a second spring-loaded piston positioned in response to reservoir pressure, and means operatively interconnecting said pistons whereby upon fall of said reservoir pressure below a predetermined value said second piston is displaced to override said control piston in the system and displace the latter to set said apportioning valve to a position corresponding to the full-laden condition of the vehicle, said pistons being disposed in a common housing and said control piston being loaded by a compression spring interposed between the two pistons while said second piston is loaded by a compression spring interposed between said second piston and an abutment on the housing.

* * * * *